Dec. 11, 1928. W. E. LEUCHTENBERG Re. 17,162
PROCESS OF REMOVING HYDROGEN SULPHIDE FROM COAL OR WATER GASES
Original Filed July 20, 1925
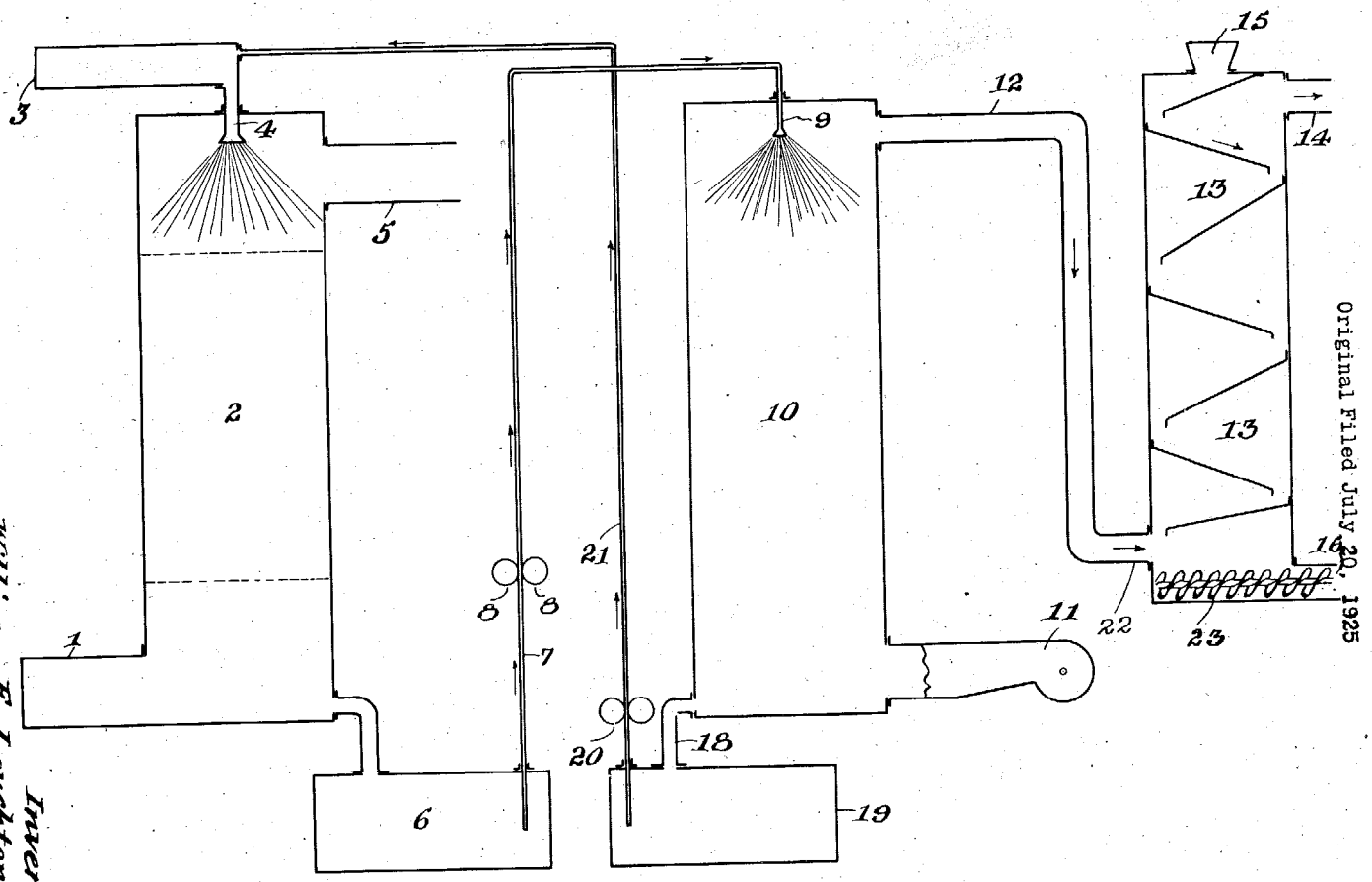
Inventor
William E. Leuchtenberg
By Mason Fenwick & Lawrence
Attorneys Reissued Dec. 11, 1928. Re. 17,162

UNITED STATES PATENT OFFICE.

WILLIAM E. LEUCHTENBERG, OF NEW YORK, N. Y.

PROCESS OF REMOVING HYDROGEN SULPHIDE FROM COAL OR WATER GASES.

Original No. 1,629,396, dated May 17, 1927, Serial No. 44,925, filed July 20, 1925. Application for reissue filed November 1, 1928. Serial No. 316,562.

This invention relates to a process for removing hydrogen sulphide from coal or water gases, and also to improvements in the apparatus used in the process.

If a flow of gases containing sulphureted hydrogen and other impurities are passed against the flow of a solution of alkaline carbonates such as sodium or potassium carbonate the sulphureted hydrogen combines with the carbonate to form sulphide or bicarbonates. This reaction has been known for a long time and has been in common use. Although published and patented a great many years ago, it has been recently incorporated in patents. The revivification of the solution thus formed, has caused some considerable difficulty.

Blowing air, or rather passing the foul solution against a stream of air and discharging the air and hydrogen sulphide liberated by the air from the foul solution into the atmosphere is the only successful means so far discovered. This, however, is objectionable as the air thus polluted with $H_2S$ is a menace to health and property and as a consequence, some of the plants operating by this method have had to discontinue their operation under pressure of public opinion, or confine operating to periods of favorable air condition.

In the drawings,

The single figure illustrates in diagrammatic form an elevational view of the apparatus used in this process.

The numeral 1 designates the foul gas inlet leading to a scrubber 2, while 3 represents an overhead tank containing alkaline carbonate solution.

Numeral 4 designates a solution spray, while 5 represents the purifier gas outlet and 6 and 7 the foul solution pump and pump line. Numeral 8 also designates a foul solution pump, 9 a foul solution spray, the foul solution spray leading into an actifying chamber 10. 11 represents an air pump and 12 a foul air duct to the purifier.

In operation the foul gas enters the foul gas inlet 1, passing upward into a vessel 2 commonly called the scrubber through which an alkaline solution from overhead tank 3 is passed downward and entering the chamber 2 from the spray 4, the purified gas leaves through a gas outlet 5 leading to the holder. The solution after having taken up $H_2S$ from the gas leaves the chamber at 17 and enters tank 6. From this tank 6 the solution is pumped by means of foul solution pump 8 through a pipe 7 to spray 9 into the purifier 10 where a flow of air pumped by pump 11 takes up the $H_2S$ in the solution. The thus actified solution runs through pipe 18 to the revivified solution tank 19, after which it is returned by pump 20 to line 21 to the overhead tank 3.

The air containing the $H_2S$ leaves the chamber 10 through a foul air duct 12 and enters the purifier 13 at 22. After passing the oxide, it leaves in a purified condition at 14. In order to make the process continuous, oxide at a low rate is supplied to the oxide purifier for foul air 13 through a hopper 15, which may be termed an inlet, continuously passing downward to be removed by a worm 23 through opening 16, the worm 23 being adapted to remove oxide and sulphur.

This invention relates to a method whereby the nuisance above described may be eliminated, and the otherwise useful method employed without danger to public health and in an economic way at little expense. The solution after fouling is subjected to the flow of air as in the older method and this air instead of discharging into the atmosphere is passed through a chamber in which a stream of substantially dry discrete particles of iron oxide is gradually and automatically passed against the flow of such air. Only a small quantity of iron oxide is required if a very active material such as is used as the iron oxide will act as a catalyst in decomposing the $H_2S$.

$3H_2S$ plus $Fe_2O_3$ equals $Fe_2S_3$ plus $3H_2O$.

$Fe_2S_3$ plus air equals $Fe_2O_3$ plus 3S plus N.

The reaction by this method however due to the catalytic action of the active iron oxide may be written $H_2S$ plus O equals $H_2O$ plus S.

This action is continuous but for the gradual poisoning of the catalyst.

For this reason there is herewith provided means for continuous renewal of the catalyst. The catalyst as discharged may contain as high as 95% sulphur in a colloidal form and is useful in the art. For example, due to this fine sub-division, it can be used to advantage to produce insecticides for fruit tree spray or for any other purposes where finely divided sulphur is advantageous.

In operation or in use this invention provides a process whereby the gas or gases may be washed free from the $H_2S$ by means of an alkali-metal carbonate solution and again be made active by passing the foul solution against a flow of air and the air subsequently through or against a stream of substantially dry discrete particles of a catalyst in form of an active condition of oxide of iron such as alpha-lux.

What I claim is:

1. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing the hydrogen sulphide from the air by passing it continuously upwardly through a stream of substantially dry discrete particles of iron oxide in active condition moving continuously downwardly through a container, continuously supplying fresh oxide at the top of the container, and withdrawing fouled or spent oxide at the bottom, and discharging the purified air from the container after passing through the newly supplied oxide.

2. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing the hydrogen sulphide from the air by passing the air through a stream of substantially dry discrete particles of iron oxide moving in the opposite direction.

3. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in purifying the air by passing it through a stream of substantially dry discrete particles of iron oxide in a suitable container, the iron oxide being continuously fed into the vessel at the top and discharged at the bottom, whereas the air containing the hydrogen sulphide enters the container at the bottom and the purified air is discharged at the top of said vessel.

4. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing hydrogen sulphide from the foul air by passing the air into a vessel and passing it upwardly counter to a stream of substantially dry discrete particles of iron oxide passing continuously downwardly, and discharging purified air at the top of the column of iron oxide, whereby the air containing the greatest amount of hydrogen sulphide comes in contact with the partially fouled oxide, and the relatively pure air comes in contact with the fresh oxide.

5. In a process for removing hydrogen sulphide from coal or water gases by treating the gases with an alkali carbonate solution to absorb the hydrogen sulphide, then activating the solution containing the hydrogen sulphide by passing the foul solution counter to a flow of air, the improvement which consists in removing hydrogen sulphide from the air prior to its discharge into the atmosphere, by passing said air continuously through a stream of substantially dry discrete particles of iron oxide passing continuously in a direction counter to the air, continuously supplying fresh oxide and at the same time removing fouled or spent oxide.

In testimony whereof, I affix my signature.

WILLIAM E. LEUCHTENBERG.